United States Patent [19]

Doyle

[11] Patent Number: 5,588,578

[45] Date of Patent: Dec. 31, 1996

[54] NAIL FLATTENING APPARATUS

[76] Inventor: James J. Doyle, 1851 Hidden Oaks Dr., Germantown, Tenn. 37138

[21] Appl. No.: 300,710

[22] Filed: Sep. 2, 1994

[51] Int. Cl.⁶ ............................. B27F 7/04; B23P 19/00
[52] U.S. Cl. ........................ 227/155; 29/798; 100/215; 100/913; 227/151
[58] Field of Search .............................. 100/215, 269.01, 100/913; 29/426.1, 426.3, 426.4, 426.5, 794, 798; 173/90, 112; 227/5, 6, 7, 39, 151, 154, 155

[56] References Cited

U.S. PATENT DOCUMENTS

| | | | |
|---|---|---|---|
| 3,512,242 | 5/1970 | Harvis | 29/252 |
| 3,651,554 | 3/1972 | Herbert | 29/200 B |
| 3,740,815 | 6/1973 | Campbell et al. | 29/200 D |
| 3,822,861 | 7/1974 | Scott | 254/93 HP |
| 3,823,861 | 7/1974 | Jureit et al. | 227/153 |
| 3,837,557 | 9/1974 | Jureit et al. | 227/152 |
| 3,846,890 | 11/1974 | Bielkiewicz | 29/200 D |
| 3,869,783 | 3/1975 | Spencer | 29/244 |
| 3,875,643 | 4/1975 | Cramer | 29/252 |
| 3,899,816 | 8/1975 | Jennings | 29/200 D |
| 3,916,498 | 11/1975 | Lopez et al. | 29/200 D |
| 3,939,548 | 2/1976 | Jureit et al. | 227/152 X |
| 3,991,459 | 11/1976 | Rapp | 29/252 |
| 4,089,098 | 5/1978 | DeMarco | 29/239 |
| 4,112,578 | 9/1978 | Sanford | 29/700 |
| 4,204,624 | 5/1980 | Gunn et al. | 227/45 |
| 4,285,110 | 8/1981 | Fagre, Jr. | 29/252 |
| 4,295,591 | 10/1981 | Lundström | 227/142 |
| 4,356,948 | 11/1982 | Bardenstein | 227/152 X |
| 4,433,464 | 2/1984 | Hebert | 29/252 |
| 4,478,361 | 10/1984 | McElhannon | 227/7 |
| 4,793,540 | 12/1988 | Mangan et al. | 227/7 |
| 4,900,329 | 2/1990 | Richardelli | 29/430 |
| 4,945,626 | 8/1990 | Dykstra et al. | 29/564.3 |
| 4,947,530 | 8/1990 | Gleason | 29/402.14 |
| 5,121,540 | 6/1992 | Dykstra | 29/772 |
| 5,137,066 | 8/1992 | Dimter | 144/2 R |
| 5,154,687 | 10/1992 | Jeslis | 493/12 |
| 5,285,720 | 2/1994 | Wright | 100/913 X |

FOREIGN PATENT DOCUMENTS 2271310  4/1994  United Kingdom ............ B25B 27/28

OTHER PUBLICATIONS

Gordon J. Pick, Oatfield Lane, Radcliffe-On-Trent, *The Green Machine Pallet Dismantler* brochure, believed as early as May 26, 1993, 4 pages.

*Primary Examiner*—Scott A. Smith
*Assistant Examiner*—Jay A. Stelacone
*Attorney, Agent, or Firm*—Walker, McKenzie & Walker, P.C.

[57] ABSTRACT

A nail flattening apparatus for use primarily in re-furbishing wooden pallet components, comprising a loading station and an operating station interconnected by a conveyor. Boards having nail stubble protruding from opposite sides are placed onto the conveyor in the loading station and transferred to the operating station, whereupon a reciprocating hammer and stationary anvil disposed on opposite sides of the conveyor cooperate to substantially flatten all nail stubble in a single operation. In the preferred embodiment, a microprocessor controls a plurality of hydraulic cylinders which automatically move each board into the proper operating position, lift each board off of the surface of the conveyor, move the hammer to compress substantially all nail stubble, release the hammer to its retracted position, return the board to the conveyor for transfer out of the operating station, and move the next board from the loading station into the operating station.

13 Claims, 8 Drawing Sheets

5,588,578

NAIL FLATTENING APPARATUS

BACKGROUND OF THE INVENTION

1. Field

This invention relates to apparatus for use in refurbishing components for wooden pallets and, more particularly, this invention relates to a salvage apparatus for flattening nail stubble on top and bottom surfaces of a pallet stringer.

2. Description of the Prior Art

A variety of devices have been developed to facilitate the assembly and repair of wooden pallets. Some devices, such as the present invention, have been developed primarily for disassembling damaged pallets and refurbishing the components for use in manufacturing recycled pallets. Examples of such devices are shown in U.S. Pat. Nos. 3,740,815, issued Jun. 26, 1973 to Campbell, et al., and 4,945,626, issued Aug. 7, 1990 to Dykstra, et al. Both the '815 and '626 patents disclose apparatus for disassembling damaged pallets, but neither discloses an apparatus for eliminating the nail stubble commonly occurring on top and bottom surfaces of the removed stringers.

There is an apparatus well known in the prior art for flattening nail stubble along top and bottom surfaces of stringers. The apparatus consist of a roller-type conveyor having a flattening station comprising a plurality of vertically orientated rollers disposed along either side of the conveyor, forming a narrow channel through which a stringer is directed. The vertical rollers exert considerable compressive force on both the top and bottom surfaces of each stringer, thereby flattening the nail stubble thereon as the stringer is moved through the rollers by the conveyor. This method of flattening nail stubble is unacceptably time consuming and labor intensive, and has been found generally insufficient at handling high production volumes.

BRIEF SUMMARY OF THE INVENTION

In order to overcome the deficiencies in prior art devices, the present invention provides a conveyor defining a loading station at one end and operating station at the opposite end. A stationary anvil and a reciprocally movable hammer are disposed at the operating station and cooperate to compress both top and bottom surfaces of a stringer, and any nail stubble extending therefore, when the hammer is forcibly driven to its extended position. A stop member disposed intermediate the loading station and operating station serves to detain each stringer traveling down the conveyor as the preceding stringer is compressed in the operating station. A plurality of lifting members are disposed beneath the conveyor within the operating station, and serve to lift each stringer slightly above the surface of the conveyor and hold the stringer stationary while the hammer is moved to its extended position. Upon completion of the compression operation, the hammer is retracted, and the lifting and stop members are simultaneously lowered so that the affected stringer is moved by the conveyor out of the operating station while the subsequent stringer is simultaneously moved into the operating station. In the preferred embodiment, a microprocessor controls the operation of a plurality of hydraulic cylinders which drive the stop member, the lifting members, and the hammer.

While it is a principal object of this invention to provide an automated nail stubbing apparatus, other objects will become apparent to those skilled in the art upon reading the following specification and reviewing the appended drawings.

DETAILED DESCRIPTION OF THE PREFERRED EMBODIMENT

Figure 1A:
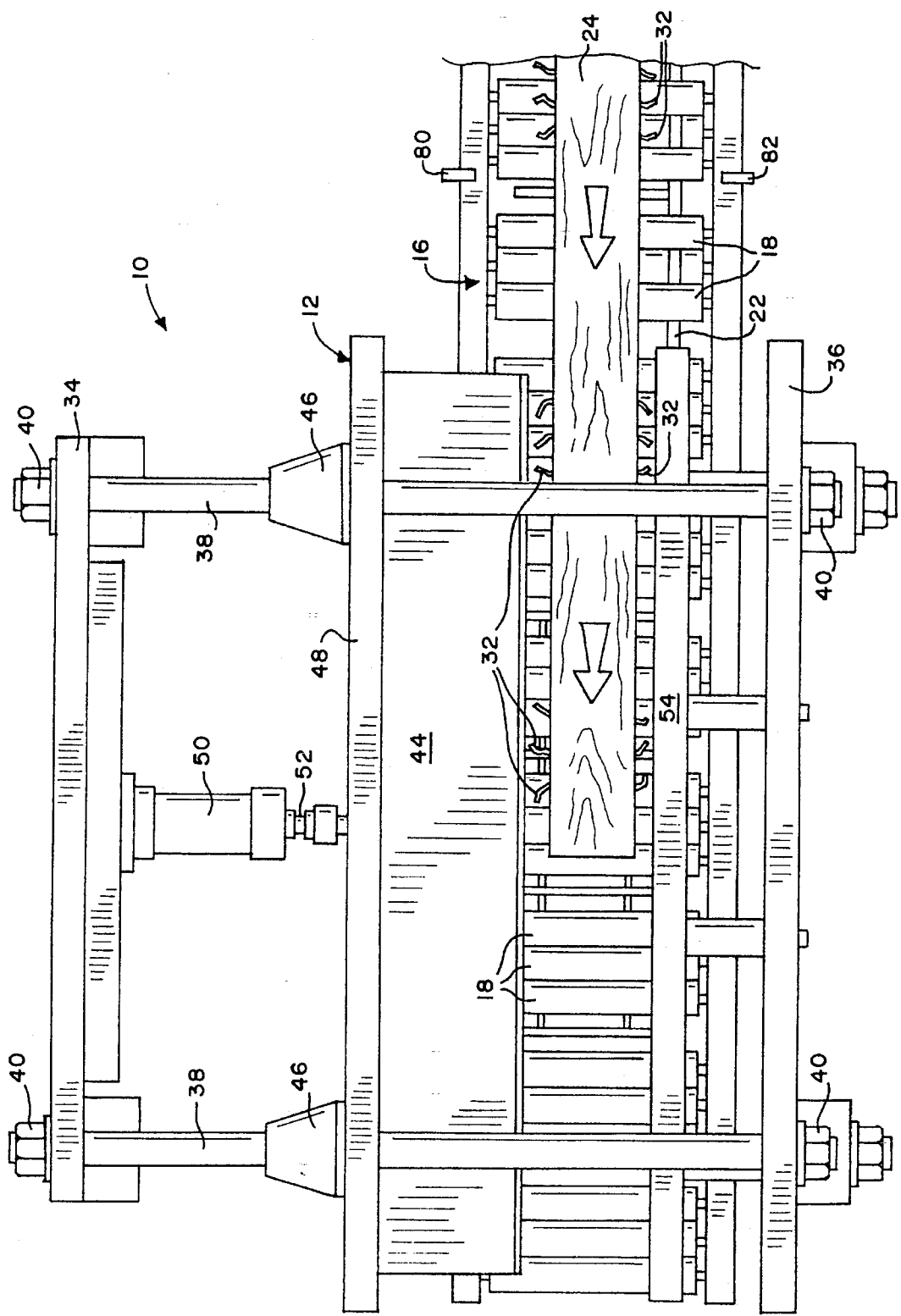
FIG. 1A is a top plan view of the operating station of the present invention, showing a stringer being moved to its operative position.
Figure 1B:
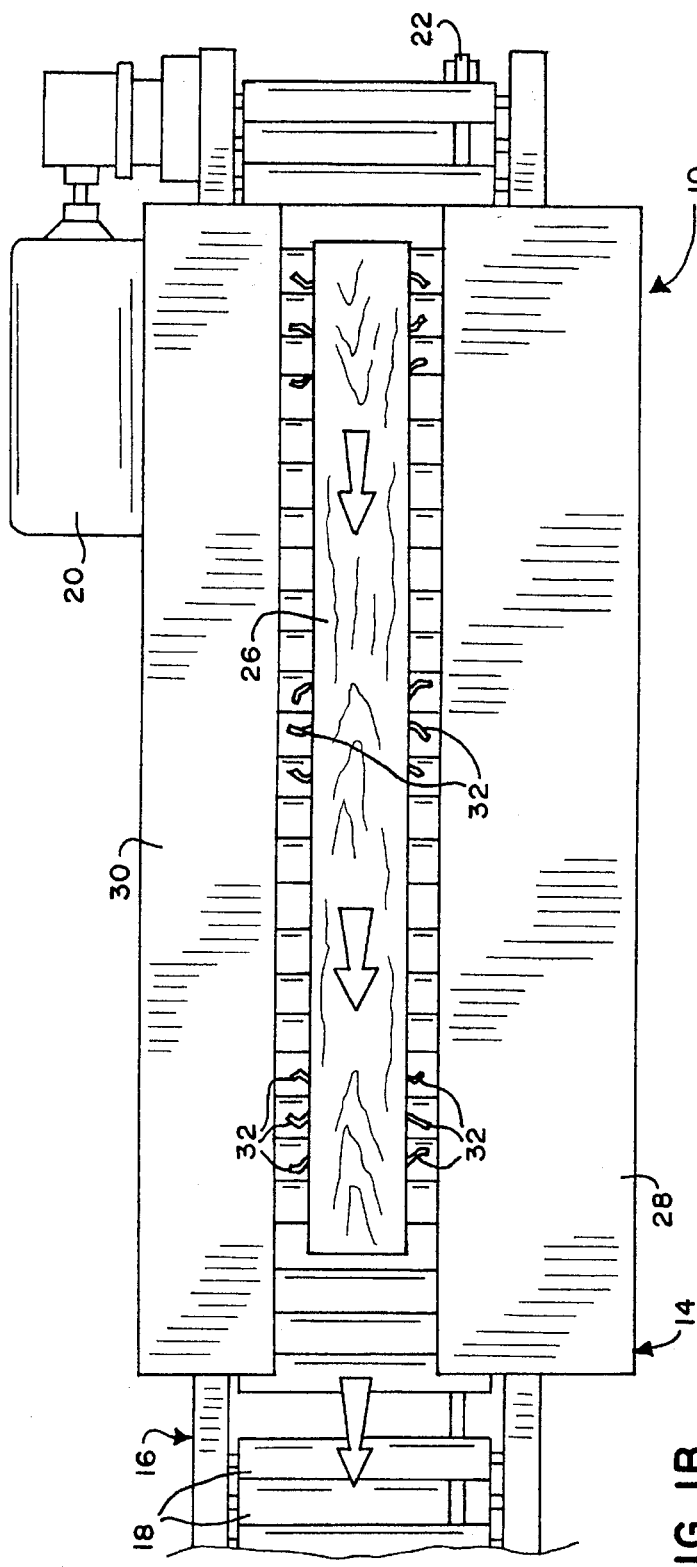
FIG. 1B is a top plan view of the loading station of the present invention.

Referring initially to FIGS. 1A and 1B, apparatus 10 is shown in a longitudinally foreshortened manner, comprising an operating station identified generally by reference numeral 12, and a loading station identified generally by reference numeral 14. Conveyor 16 extends longitudinally the length of apparatus 10, comprising a plurality of rollers 18 driven by a generally conventional motor 20 and driving belt 22. Conveyor 16 serves as support means for boards 24 and 26, and serves to define the bottom surface of operating station 12 and loading station 14.

Figure 5:
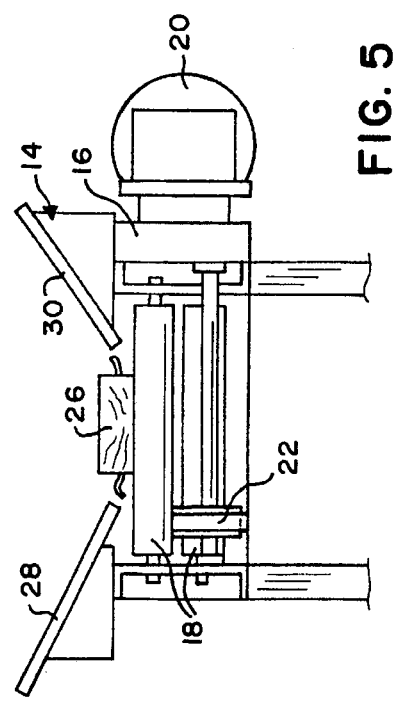
FIG. 5 is an end elevational view of the loading station.

As best seen in FIG. 5, loading station 14 comprises a pair of angled ramps 28 and 30 mounted to the side rails of conveyor 16 on opposite sides thereof. Ramps 28 and 30 are configured to facilitate the loading of boards, such as boards 24 and 26 onto conveyor 16. The inclination of ramps 28 and 30 serve to direct boards onto rollers 18 within loading station 14 in a position and orientation suitable for moving the boards via conveyor 16 into operating station 12. Ramps 28 and 30 therefore facilitate and expedite the process of loading boards into apparatus 10.

As clearly seen in FIGS. 1A and 1B, boards 24 and 26 include a plurality of nail stubs 32 extending laterally therefrom. As those skilled in the art will readily appreciate, such nail stubble is typical of stringers removed from damaged or disassembled pallets. Apparatus 10 represents a unique means and method of flattening nails stubs 32 so that the stringers, i.e., boards 24 and 26, may be reused.

Figure 2:
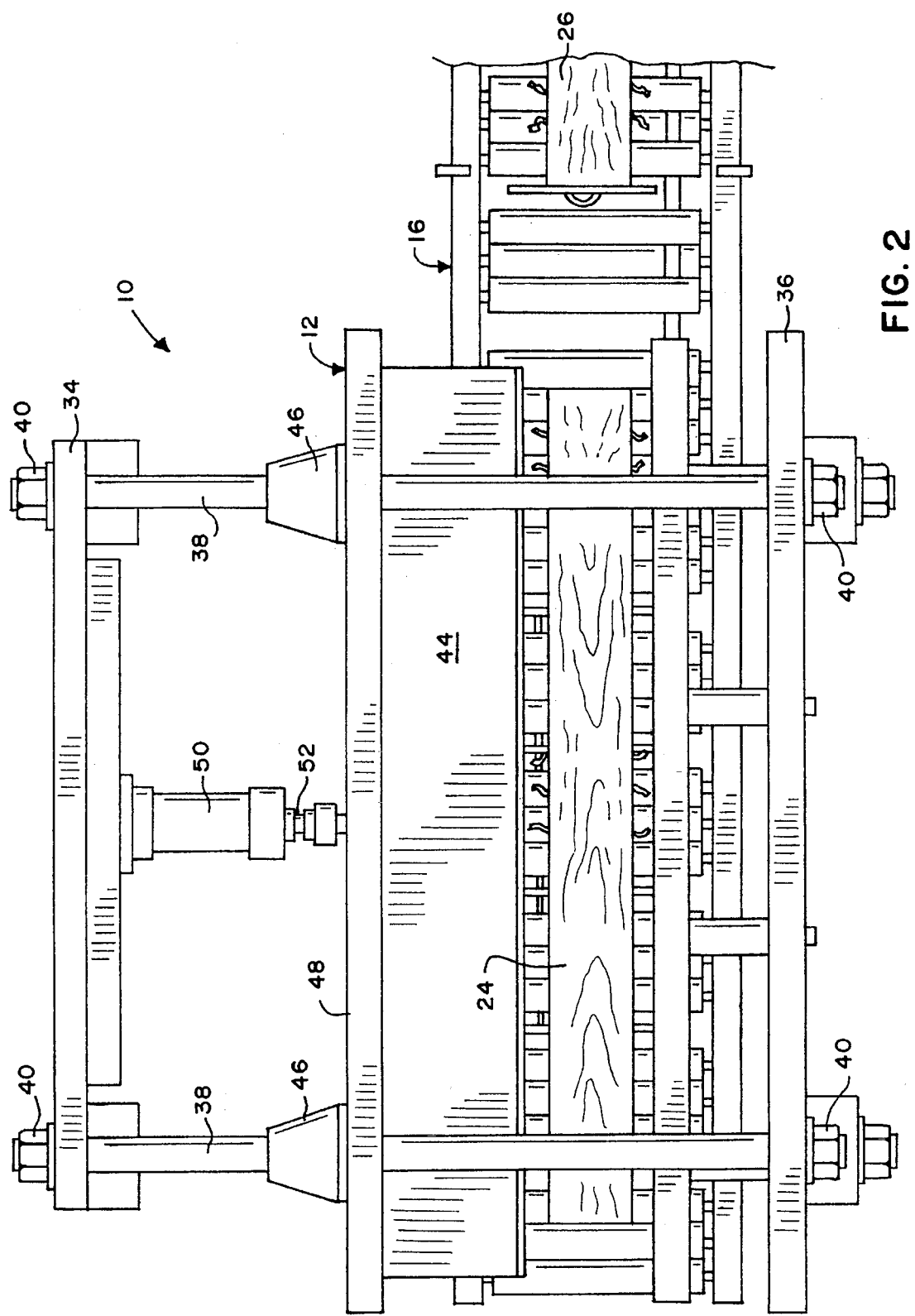
FIG. 2 is a top plan view of the operating station similar to FIG. 1A, showing a first stringer in its operating position while a second stringer is detained by the stop member.
Figure 3:
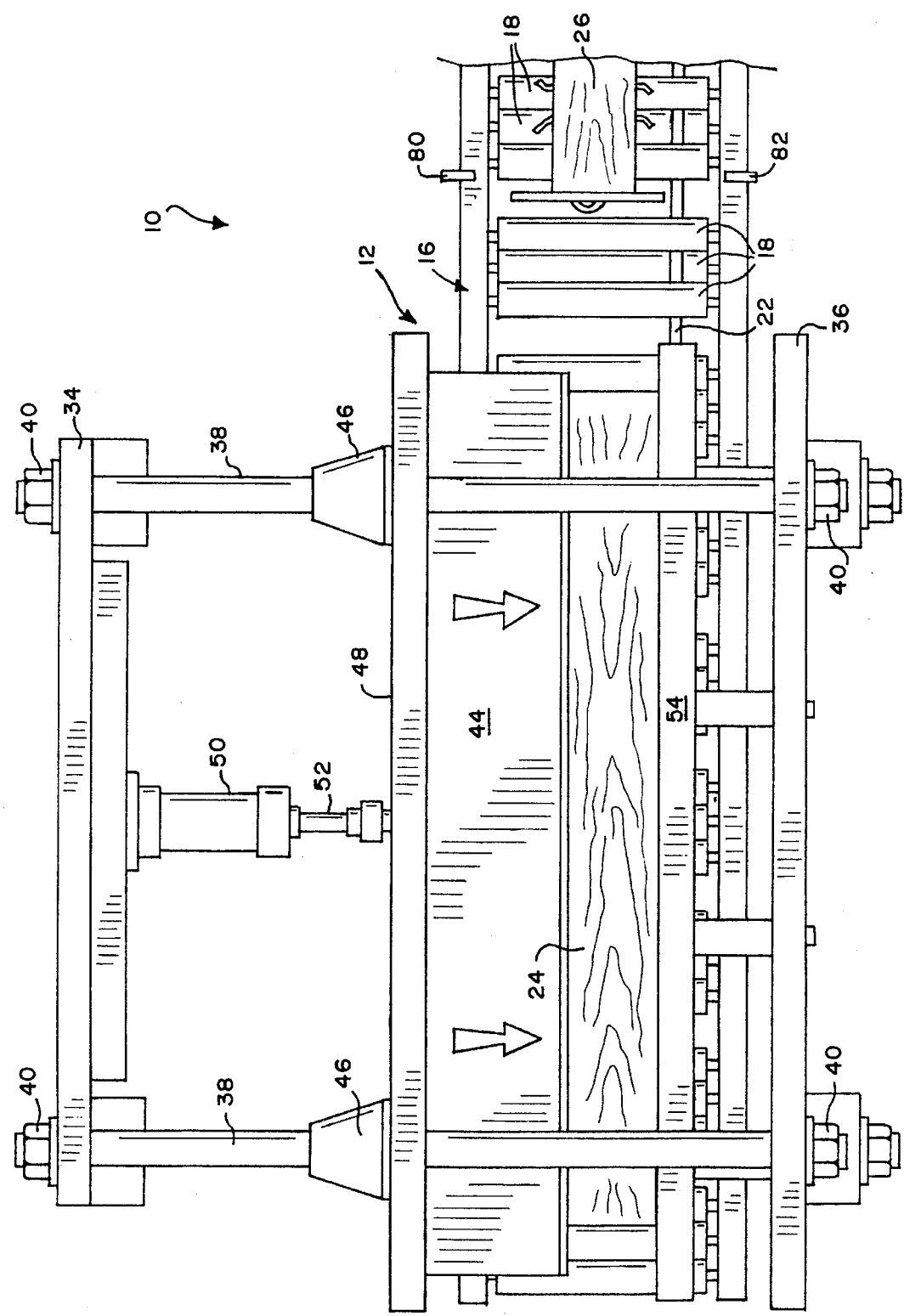
FIG. 3 is a top perspective view of the operating station similar to FIG. 2, showing the hammer in its extended position for compression of nail stubble.
Figure 4:
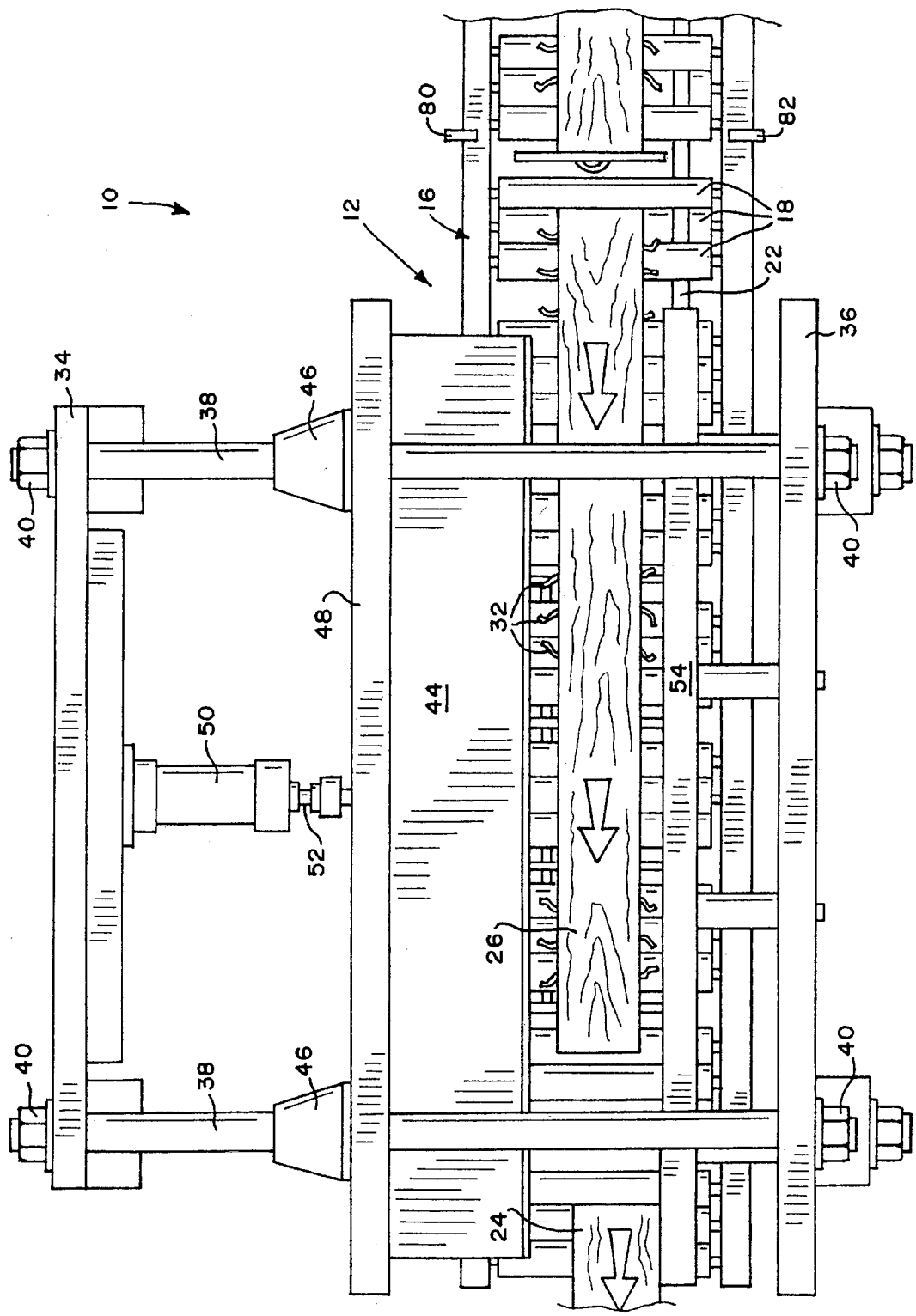
FIG. 4 is a top perspective view similar to FIG. 3 showing the hammer retracted to allow a second stringer to move into operating position.
Figure 6:
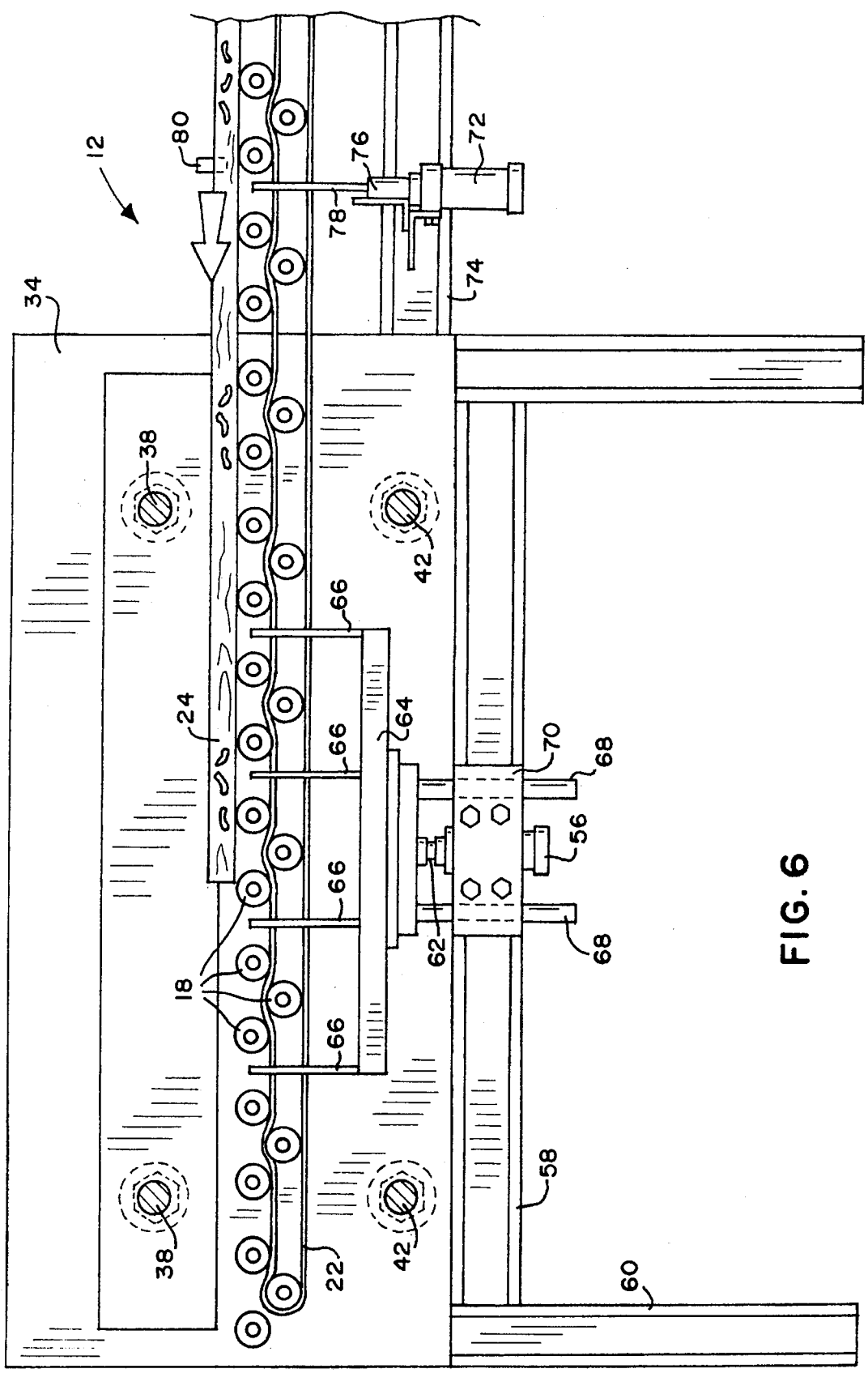
FIG. 6 is a side sectional view through the operating station, showing a stringer being moved into its operating position.
Figure 7:
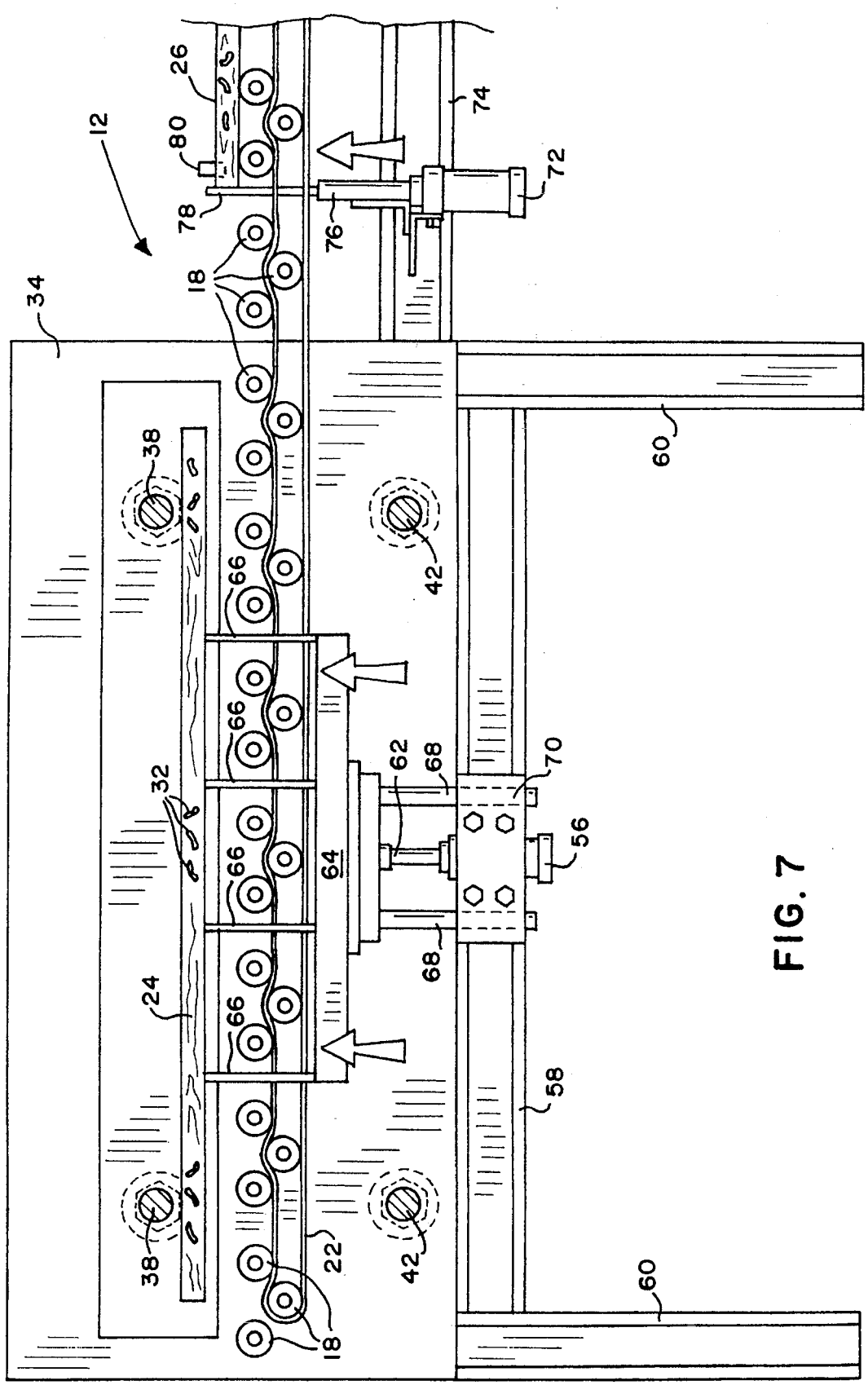
FIG. 7 is a side sectional view similar to FIG. 6, showing the lifting members in their raised position.
Figure 8:
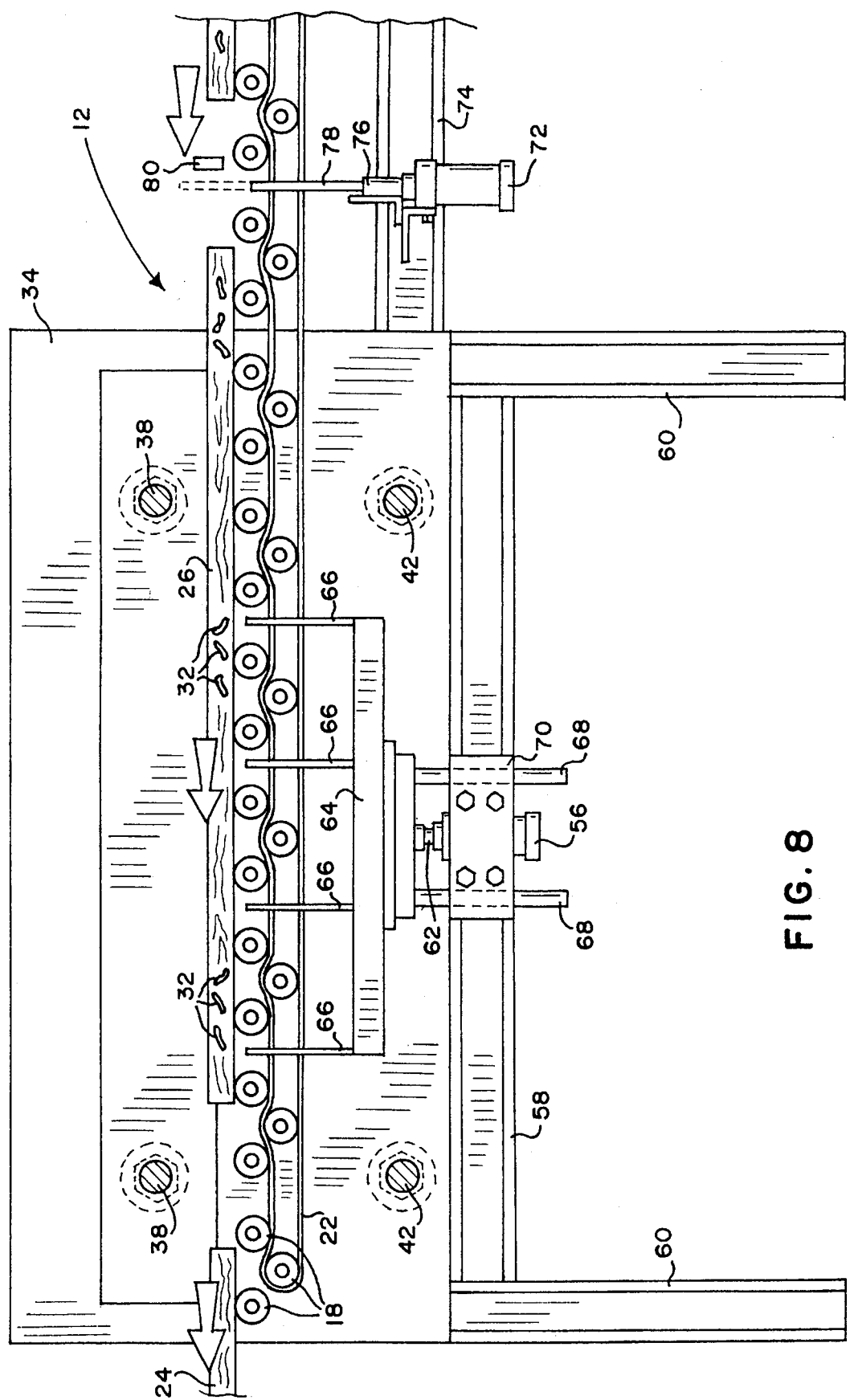
FIG. 8 is a side sectional view similar to FIG. 7, showing the lifting members and stop member in their lowered positions.

With reference now to FIGS. 1A and 2–4, operating station 12 comprises a pair of stationary upright walls 34 and 36, the upper portions of which are interconnected by rods 38 and nuts 40 as best seen in FIGS. 6–8, the lower portion of walls 34 and 36 are similarly interconnected by a pair of rods 42. A hammer 44 is slidably mounted on rods 38, with bearings 46 being secured to the back surface 48 to facilitate reciprocal movement of hammer 44 along rods 38. A cylinder 50 is secured to wall 34, having a piston 52 drivingly engaging surface 48 of hammer 44. Cylinder 50 is preferably hydraulically actuated, and is selectively movable between a retracted position as shown in FIG. 2 and an extended position as shown in FIG. 3. Anvil 54 is disposed laterally opposite from hammer 44, and is fixedly secured to wall 36. As explained more fully below, boards are fed into operating station 12 while hammer 44 is in its retracted position and, upon actuation of cylinder 50 and corresponding movement of hammer 44 to its extended position, hammer 44 and anvil 54 cooperate to simultaneously flatten substantially all nail stubble appearing on opposite edges of each board.

Referring now to FIGS. 6–8, a second cylinder 56 is secured to brace 58 extending longitudinally between legs 60. Piston 62 extends vertically from cylinder 56 and drivingly engages lifting structure 64 which includes a plurality of lifting members 66 extending vertically therefrom. Shafts 68 extend downwardly from the underside of lifting structure 64, passing through bearing block 70. Cylinder 56, which is preferably hydraulically actuated, is selectively operable to reciprocally drive piston 62 between a retracted position, shown in FIGS. 6 and 8, and an extended position shown in FIG. 7. As seen in FIG. 7, the extension of piston 62 drives lifting structure 64 and lifting members 66 upwardly, thereby raising each board slightly above the top surface of rollers 18. This ceases the forward movement of each board while allowing the continuous operation of conveyor 16 so that nail stubs 32 may be flattened as described herein.

A third cylinder 72 is secured to frame member 74 in a vicinity longitudinally intermediate loading station 14 and operating station 12. A piston 76 extends vertically from cylinder 72, and has a stop member 78 secured thereto. When moved to its extended position shown in FIG. 7, stop member 78 impedes the progress of boards moving along conveyor 16. When stop member 78 is returned to its retraction position as shown in FIGS. 6 and 8, boards may progress from the loading station into the operating station. In the preferred embodiment shown, position detectors 80 and 82 sense the leading and trailing edges of each board moving along conveyor 16, and automatically actuate cylinder 72 accordingly. Position detectors 80 and 82 are purely conventional, and will be well known to those skilled in the art. Cylinder 72 is preferably hydraulic, but may be pneumatic or mechanical as desired.

DESCRIPTION OF THE PREFERRED OPERATION

The operation of apparatus 10 is preferably controlled by a conventional microprocessor, so that the operator's only responsibility, other than turning apparatus 10 on and off, is loading boards into loading station 14. It is expected that the hardware and software required for the controlling microprocessor will be purely conventional, and will be easily reproduced by one skilled in the art of computerized controls. In the following description of the operation of apparatus 10, reference numeral 24 will signify the first board placed in loading station 14 by the user, and numeral 26 will reference the second board. It is to be understood that the nail stubbing process accomplished by apparatus 10 may be carried out continuously, on a multitude of boards. For ease of discussion, however, the process will be described in the context of two boards 24 and 26.

Referring initially to FIGS. 1A and 6, board 24 is seen as it is carried from loading station 14 into operating station 12 by rollers 18 of conveyor 16. Position detectors 80 and 82 have detected the leading edge of board 24, and will likewise detect the trailing edge of board 24 as soon as it passes therebetween. Based upon the time elapsed between the detection of the leading and trailing edges, together with the linear velocity of conveyor 16, the microprocessor is able to calculate the length of board 24, and therefore determine the point in time at which board 24 is positioned substantially in the center of operating station 12, as shown in FIG. 2. Additionally, within moments of the trailing edge of board 24 passing between position detectors 80 and 82, the microprocessor actuates cylinder 72, thereby moving stop member 78 to its extended position thereby retaining board 26.

As soon as the microprocessor determines that board 24 is substantially centered within operating station 12, cylinder 56 is actuated to move lifting members 66 to their extended positions, as seen in FIG. 7. At this point, boards 24 and 26 are momentarily stationary, with board 24 being supported in an operative position by lifting members 66 and board 26 being blocked by stop member 78, while conveyor 16 continues to operate. Once piston 62 is fully extended, cylinder 50 may be automatically actuated by the microprocessor control to move hammer 44 to its extended position, whereupon hammer 44 and anvil 54 cooperate to compress and flatten substantially all nail stubs 32 on either side of board 24. Cylinder 50 is then returned to its retracted position, thereby releasing board 24, and cylinder 56 returned to its retracted position, thereby lowering lifting members 66 and returning board 24 onto rollers 18 which proceed to move board 24 out of operating station 12. Cylinder 72 may then be released to its retracted position, so that stop member 78 releases board 26 and allows conveyor 16 to move board 26 from loading station into operating station 12, at which point the nail stubbing process described above relative to board 24 is repeated relative to board 26.

It will be appreciated that it may be preferable to release cylinders 56 and 72 to their retracted positions concurrently, so that board 24 is moved out of operating station 12 while board 26 is simultaneously moved into operating station 12. As each board exits operating station 12, it may be carried by conveyor 16 to a subsequent assembly station or, in the alternative, it may simply be deposited onto a trailer or pallet and manually carried to another workstation. Those skilled in the art of pallet assembly will readily appreciate the numerous possibilities and potential uses for apparatus 10.

While the principals of a nail stubbing apparatus in accordance with the preferred embodiment have been made clear by the foregoing description, it is fully expected that numerous modifications may be made in the embodiment disclosed herein without departing from the spirit and scope of this invention. Accordingly, the scope of this patent is to be limited only by the language of the following claims and the relevant prior art.

What is claimed is:

1. An apparatus for eliminating nail stubble from first and second opposite, generally parallel surfaces along the length of a board, comprising:

(a) support means for supporting said board in an operative position;

(b) an anvil disposed adjacent said support means, having a bearing surface facing said board generally parallel to said first surface and extending the entire length thereof when said board is in said operative position;

(c) a hammer disposed adjacent said support means opposite said anvil, having a bearing surface facing said board generally parallel to said second surface and extending the entire length thereof when said board is in said operative position, said hammer being selectively moveable between extended and retracted positions; and (d) driving means for forcibly moving said hammer to said extended position and returning said hammer to said retracted position, said hammer being moved toward said anvil upon movement to said extended position;

wherein:

said board is disposed intermediate said anvil and said hammer when in said operative position;

movement of said hammer to said extended position compresses said board between said bearing surface of said anvil and said bearing surface of said hammer with sufficient force to suitably flatten any nail stubble on either said first or second surface of said board;

movement of said hammer to said retracted position releases said board;

said support means comprises a conveyor for moving said board into said operative position prior to moving said hammer to said extended position, and for moving said board out of said operative position upon moving said hammer to said retracted position;

said conveyor extends longitudinally intermediate said anvil and said hammer and includes a moving top surface upon which said board is carried into and out of said operative position; and said apparatus further comprises a plurality of lifting members disposed beneath said conveyor intermediate said anvil and said hammer, said lifting members being selectively moveable between raised and lowered positions, wherein in said raised position said lifting members elevate said board above the top surface of said conveyor while maintaining said board in said operative position.

2. An apparatus for eliminating nail stubble from first and second opposite, generally parallel surfaces along the length of a board, comprising:

(a) support means for supporting said board in an operative position;

(b) an anvil disposed adjacent said support means, having a bearing surface facing said board generally parallel to said first surface and extending the entire length thereof when said board is in said operative position;

(c) a hammer disposed adjacent said support means opposite said anvil, having a bearing surface facing said board generally parallel to said second surface and extending the entire length thereof when said board is in said operative position, said hammer being selectively moveable between extended and retracted positions; and (d) driving means for forcibly moving said hammer to said extended position and returning said hammer to said retracted position, said hammer being moved toward said anvil upon movement to said extended position;

wherein:

said board is disposed intermediate said anvil and said hammer when in said operative position;

movement of said hammer to said extended position compresses said board between said bearing surface of said anvil and said bearing surface of said hammer with sufficient force to suitably flatten any nail stubble on either said first or second surface of said board;

movement of said hammer to said retracted position releases said board;

said support means comprises a conveyor extending longitudinally intermediate said anvil and said hammer and including a moving top surface upon which a plurality of said boards are individually carried into and out of said operative position;

said conveyor having a loading station disposed adjacent said anvil and said hammer upon which a plurality of said boards may be placed in a longitudinally spaced apart relationship for individually moving each said board to said operative position, said conveyor also having an operating station disposed between said anvil and said hammer defining said operative position for said board;

said apparatus further comprising:

a stop member disposed beneath said conveyor intermediate said loading station and said operating station, selectively moveable between raised and lowered positions, wherein in said raised position said stop member impedes the movement of said boards to said operating station;

a plurality of lifting members disposed beneath said operating station, said lifting members being selectively moveable between raised and lowered positions, wherein in said raised position said lifting members elevate said board above the top surface of said conveyor while maintaining said board in said operative position; and control means for simultaneously controlling the operation of said stop member, said lifting members, and said driving means, whereby a second board is detained in said loading station by said stop member while a first board is elevated by said lifting members in said operative position and said hammer is moved to said extended position thereby compressing said first board and flattening any nail stubble thereon.

3. An apparatus as set forth in claim 2, wherein said control means are further operative to substantially simultaneously:

(a) move said hammer to said retracted position, (b) move said lifting members to said lowered position thereby allowing said conveyor to move said first board out of said operating station, and (c) move said stop member to said lowered position thereby allowing said conveyor to move said second board to said operating station, and, upon said second board being moved to said operative position, to:

(d) move said lifting members to said raised position thereby elevating said second board and (e) move said stop member to said raised position thereby impeding the movement of a subsequent board.

4. An apparatus as set forth in claim 3, wherein said control means comprise:

at least one hydraulic cylinder operatively connected to said lifting members and said stop member, selectively actuatable to move said lifting members and said stop member between said raised and lowered positions.

5. An apparatus as set forth in claim 3, wherein said control means comprise:

a microprocessor suitable for receiving impulses and generating electrical signals in response thereto, said signals being operative to selectively move said lifting members and said stop member between said raised and lowered positions; and detecting means communicating with said microprocessor for detecting the position of said boards and generating said impulses, whereby said lifting members and said stop member are moved in response to the position of said boards.

6. An apparatus as set forth in claim 5, wherein said detecting means comprise at least one optical position detector disposed adjacent said conveyor generally intermediate said loading station and said operating station.

7. An apparatus as set forth in claim 5, wherein each said board has a leading and a trailing edge and:

(a) said detecting means are operative to detect both the leading and trailing edges of each said board as said boards are moved by said conveyor from said loading station to said operating station, and generate said impulses responsive thereto; and (b) said microprocessor calculates the length of each said board and moves said lifting members to said raised position upon said board being substantially centered longitudinally within said operating station.

8. An apparatus as set forth in claim 7, wherein:

said microprocessor is further operative to move said stop member to said raised position upon passage of said trailing edge of each said board past said detecting means.

9. An apparatus for compressing nail stubble on top and bottom surfaces of a pallet stringer, comprising:

(a) a conveyor defining a loading station, whereupon a plurality of said stringers may be individually placed in said apparatus, and an operating station, whereupon each said stringer is individually compressed, said conveyor having a moving upper surface;

(b) an anvil disposed adjacent said upper surface of said conveyor in the vicinity of said operating station;

(c) a hammer disposed adjacent said upper surface of said conveyor in the vicinity of said operating station facing said anvil, said hammer being reciprocally moveable between extended and retracted positions; and (d) driving means for forcibly driving said hammer to said extended position, said hammer being relatively close to said anvil when in said extended position;

wherein a stringer, placed longitudinally in said loading station with said top and bottom surfaces projecting laterally, is moved by said conveyor into said operating station, whereupon said hammer is moved to said extended position such that said hammer and said anvil forcibly engage said top and bottom surfaces of said stringer, thereby compressing any nail stubble extending therefrom;

said apparatus further comprising:

(e) at least one lifting member disposed beneath said operating station, selectively moveable between raised and lowered positions, wherein in said raised position said at least one lifting member elevates said stringer above the upper surface of said conveyor while maintaining said stringer in said operating station intermediate said hammer and said anvil.

10. An apparatus for compressing nail stubble on top and bottom surfaces of a pallet stringer, comprising:

(a) a conveyor defining a loading station, whereupon a plurality of said stringers may be individually placed in said apparatus, and an operating station, whereupon each said stringer is individually compressed, said conveyor having a moving upper surface;

(b) an anvil disposed adjacent said upper surface of said conveyor in the vicinity of said operating station;

(c) a hammer disposed adjacent said upper surface of said conveyor in the vicinity of said operating station facing said anvil, said hammer being reciprocally moveable between extended and retracted positions; and (d) driving means for forcibly driving said hammer to said extended position, said hammer being relatively close to said anvil when in said extended position;

wherein a stringer, placed longitudinally in said loading station with said top and bottom surfaces projecting laterally, is moved by said conveyor into said operating station, whereupon said hammer is moved to said extended position such that said hammer and said anvil forcibly engage said top and bottom surfaces of said stringer, thereby compressing any nail stubble extending therefrom;

said apparatus further comprising:

(e) a stop member disposed beneath said conveyor intermediate said loading station and said operating station, selectively moveable between raised and lowered positions, wherein in said raised position said stop member impedes the movement of said stringers to said operating station;

(f) at least one lifting member disposed beneath said operating station, selectively moveable between raised and lowered positions, wherein in said raised position said at least one lifting member elevates a first stringer above the upper surface of said conveyor while maintaining said first stringer in said operative position; and (g) control means for simultaneously controlling the operation of said stop member, said lifting member, and said driving means, whereby a second stringer is detained in said loading station by said stop member while said first stringer is elevated by said lifting member in said operative position and said hammer is moved to said extended position thereby compressing said first stringer and flattening any nail stubble thereon.

11. An apparatus as set forth in claim 10, wherein said control means comprise:

(a) a microprocessor suitable for receiving impulses and generating electrical signals in response thereto, said signals being operative to selectively move said at least one lifting member and said stop member between said raised and lowered positions; and (b) at least one position detector communicating with said microprocessor for detecting the position of said stringers and generating said impulses, whereby said at least one lifting member and said stop member are moved in response to the position of said stringers.

12. An apparatus as set forth in claim 11, wherein each said stringer has a leading and a trailing edge and wherein:

(a) said at least one position detector is operative to detect both the leading and trailing edges of each said stringer as said stringers are moved by said conveyor from said loading station to said operating station, and generate said impulses responsive thereto; and (b) said microprocessor calculates the length of each said stringer and moves said at least one lifting member to said raised position upon said stringer being substantially centered longitudinally within said operating station.

13. An apparatus as set forth in claim 10, wherein:
said driving means are further operative to automatically return said hammer to said retracted position subsequent to compressing said nail stubble on said first stringer; and
said control means are further operative to sense the movement of said hammer to said retracted position and thereupon move said at least one lifting member and said stop member to said lowered positions, thereby allowing said conveyor to move said first stringer out of said operating station and move said second stringer from said loading station into said operating station.

* * * * *